(12) United States Patent
Scott et al.

(10) Patent No.: US 9,803,787 B2
(45) Date of Patent: Oct. 31, 2017

(54) MAGNETICALLY ATTRACTED FLUID TRANSFER SYSTEM

(71) Applicants: Gregory P. Scott, Washington, DC (US); Carl Glen Henshaw, Port Republic, MD (US)

(72) Inventors: Gregory P. Scott, Washington, DC (US); Carl Glen Henshaw, Port Republic, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 991 days.

(21) Appl. No.: 14/028,077

(22) Filed: Sep. 16, 2013

(65) Prior Publication Data

US 2014/0232101 A1 Aug. 21, 2014

Related U.S. Application Data

(60) Provisional application No. 61/700,998, filed on Sep. 14, 2012.

(51) Int. Cl.
  *F16L 37/00* (2006.01)
  *B63B 27/34* (2006.01)
  *F16L 55/10* (2006.01)

(52) U.S. Cl.
  CPC .......... *F16L 37/004* (2013.01); *B63B 27/34* (2013.01); *F16L 55/1015* (2013.01)

(58) Field of Classification Search
  CPC ......... B63B 27/24; B63B 27/25; B63B 27/26; B63B 27/28; B63B 27/30; B63B 27/32;
  (Continued)

(56) References Cited

U.S. PATENT DOCUMENTS 2,678,228 A * 5/1954 Gerhardt ............... A61B 1/227
  15/145
2,793,057 A * 5/1957 McGugin ............... F16L 37/00
  285/114

(Continued)

FOREIGN PATENT DOCUMENTS

DE 202010001422 U1 4/2010
EP 0079404 A1 5/1983
(Continued)

OTHER PUBLICATIONS

Educational Innovations Inc, Floating Ring Magnet Set, published May 16, 2012.*

(Continued)

*Primary Examiner* — Timothy L Maust
*Assistant Examiner* — Andrew Stclair
(74) *Attorney, Agent, or Firm* — US Naval Research Laboratory; Scott G. Bell

(57) ABSTRACT

A magnetic connection system with at least three components for connecting host and target systems. A first magnetic connector is attached to the host system, a second magnetic connector is attached to the target system; a third magnetic connector or puck is positioned between the first connector and the second connector. The first, second, and third connectors fit together with their magnets aligned, and the magnetic attraction is stronger between the puck and the target system connector than the puck and the host system connector. The system can transfer fuel, data, or electricity. In one example, the system transfers fuel from a fuel supply vessel to a target vessel with minimal human effort to attach the fuel connector components. The puck can have a conduit for fuel, data, or electricity that is centrally aligned with a receiving conduit in the target system connector.

24 Claims, 7 Drawing Sheets

(58) Field of Classification Search
CPC ..... B63B 27/34; B63B 22/021; B63B 22/023; B63B 22/025; B63B 22/026; B67D 9/00; B67D 9/02; B67D 7/54; F16L 37/004; F16L 55/1015
USPC .......................................................... 285/9.1
See application file for complete search history.

(56) References Cited

U.S. PATENT DOCUMENTS

| | | | |
|---|---|---|---|
| 2,953,970 A * | 9/1960 | Maynard | G02B 7/00 248/206.5 |
| 3,181,895 A * | 5/1965 | Cator | F16L 37/004 285/1 |
| 3,494,387 A * | 2/1970 | Grigg | B67D 7/005 141/104 |
| 4,004,298 A * | 1/1977 | Freed | A61M 39/0247 285/9.1 |
| 4,166,485 A * | 9/1979 | Wokas | B67D 7/421 141/207 |
| 4,691,941 A | 9/1987 | Rabushka et al. | |
| 4,791,961 A | 12/1988 | Nitzberg et al. | |
| 4,827,977 A | 5/1989 | Fink, Jr. | |
| 4,854,338 A | 8/1989 | Grantham | |
| 4,879,045 A * | 11/1989 | Eggerichs | B03C 1/035 204/557 |
| 4,899,792 A | 2/1990 | Podgers | |
| 4,905,733 A | 3/1990 | Carow | |
| 4,917,149 A | 4/1990 | Grantham | |
| 4,991,626 A | 2/1991 | Grantham | |
| 5,014,028 A * | 5/1991 | Leupold | H01F 7/0278 315/3.5 |
| 5,014,732 A | 5/1991 | Nitzberg | |
| 5,115,836 A | 5/1992 | Carow et al. | |
| 5,138,139 A * | 8/1992 | Mitsutoshi | F16L 55/00 235/375 |
| 5,184,309 A | 2/1993 | Simpson et al. | |
| 5,209,262 A | 5/1993 | Carow et al. | |
| 5,365,973 A | 11/1994 | Fink, Jr. et al. | |
| 5,372,306 A | 12/1994 | Yianilos | |
| 5,529,085 A | 6/1996 | Richards et al. | |
| 5,540,250 A | 7/1996 | Mullins | |
| 5,613,831 A * | 3/1997 | Liegat | F04D 29/041 415/229 |
| 6,050,297 A | 4/2000 | Ostrowski et al. | |
| 6,279,874 B1 | 8/2001 | Nyberg | |
| 6,736,157 B1 | 5/2004 | Andersson et al. | |
| 6,866,306 B2 * | 3/2005 | Boyle | E21B 17/028 166/66.5 |
| 6,899,131 B1 | 5/2005 | Carmack et al. | |
| 7,165,576 B2 | 1/2007 | Carmack et al. | |
| 7,241,300 B2 * | 7/2007 | Sharkawy | A61B 17/0643 128/898 |
| 7,281,687 B2 | 10/2007 | Schroeder | |
| 7,311,526 B2 | 12/2007 | Rohrbach et al. | |
| 7,326,350 B2 * | 2/2008 | Mueller | B03C 1/035 210/222 |
| 7,516,920 B2 | 4/2009 | Schroeder | |
| 7,517,222 B2 | 4/2009 | Rohrbach et al. | |
| 7,575,023 B2 | 8/2009 | Fraser | |
| 7,575,024 B2 | 8/2009 | Zeiber et al. | |
| 7,641,477 B2 | 1/2010 | DiFonzo et al. | |
| 7,645,143 B2 | 1/2010 | Rohrbach et al. | |
| 7,708,029 B2 | 5/2010 | Kitagawa et al. | |
| 7,762,279 B2 | 7/2010 | Zeiber et al. | |
| 7,762,817 B2 | 7/2010 | Ligtenberg et al. | |
| 7,798,831 B2 | 9/2010 | Sanford et al. | |
| 7,841,776 B2 | 11/2010 | DiFonzo et al. | |
| 7,901,216 B2 | 3/2011 | Rohrbach et al. | |
| 7,942,678 B2 | 5/2011 | Sanford et al. | |
| 7,984,928 B2 | 7/2011 | Bergling et al. | |
| 8,210,572 B2 | 7/2012 | Davis | |
| 8,518,062 B2 * | 8/2013 | Cole | A61B 17/0057 606/153 |
| 2004/0237868 A1 * | 12/2004 | Poldervaart | B63B 27/24 114/230.15 |
| 2006/0232368 A1 * | 10/2006 | Gorshkov | G01R 33/3806 335/306 |
| 2007/0289517 A1 * | 12/2007 | Poldervaart | B63B 21/04 114/230.15 |
| 2008/0143098 A1 | 6/2008 | Zimmermann et al. | |
| 2008/0185060 A1 * | 8/2008 | Nelson | E03C 1/0404 137/801 |
| 2009/0205343 A1 * | 8/2009 | Dupont | B63B 27/24 62/50.7 |
| 2010/0263389 A1 * | 10/2010 | Bryngelson | F17C 13/02 62/50.2 |
| 2010/0322826 A1 * | 12/2010 | Locascio | B01J 19/0093 422/537 |
| 2010/0326667 A1 * | 12/2010 | Coppens | B63B 27/24 166/355 |
| 2011/0084474 A1 | 4/2011 | Paden et al. | |
| 2011/0277845 A1 * | 11/2011 | Le Devehat | B63B 27/24 137/1 |
| 2012/0013117 A1 * | 1/2012 | Bernshtein | F16L 37/004 285/9.1 |
| 2014/0166156 A1 * | 6/2014 | Dicke-Kuenitz | B63B 27/34 141/263 |
| 2017/0050526 A1 * | 2/2017 | Sommarstrom | B60L 11/1816 |

FOREIGN PATENT DOCUMENTS

| | | |
|---|---|---|
| EP | 1308384 A2 | 5/2003 |
| EP | 1308384 A3 | 9/2003 |
| GB | 2480155 A | 11/2011 |

OTHER PUBLICATIONS

International Search Report dated Dec. 16, 2013, PCT/US13/059978, 9 pages.
Extended European Search Report, Application No. 13837909.4 (PCT/US2013/059978) dated Mar. 21, 2016, pp. 1-6.

* cited by examiner

MAGNETICALLY ATTRACTED FLUID TRANSFER SYSTEM

CROSS-REFERENCE TO RELATED APPLICATIONS

This Application is a non-provisional application under 35 USC 119(e) of, and claims the benefit of, U.S. Provisional Application 61/700,998 filed on Sep. 14, 2012, the entire disclosure of which is incorporated herein in its entirety.

BACKGROUND

Technical Field

This application is related to quick disconnect connectors, and more particularly, to quick disconnect fluid-dispensing and fuel-dispensing connectors.

Related Technology

For Naval vessels, refueling at sea can be challenging, dangerous, and sometimes deadly. Refueling unmanned surface vessels (USVs) and unmanned underwater vessels (UUVs) can be even more difficult, because sailors are often hoisted overboard by crane to manually refuel the vehicles. This maneuver is particularly dangerous in high sea states.

Some milling machines use quick-connect/disconnection tools to allow an electrical or pneumatic connection to be made between a host system and a target system. However, these precision instruments require an exact connection to be made, and do not allow for any alignment error. Other pneumatic quick-disconnect mechanisms require user intervention to attach and detach.

Some magnetic connectors allow for the transmission of electricity. For example, U.S. Pat. No. 7,311,526, to Rohrbach et al., provides an electrical plug and receptacle of the type used in an Apple laptop computer.

A magnetically-connected quick disconnect mechanism for fluid transfer is disclosed in U.S. Pat. No. 7,891,637. This connector is disclosed as requiring a person to connect and disconnect the system.

BRIEF SUMMARY

One aspect of an invention is directed to a magnetic connection system having at least three components for connecting a host system and a target system, comprising: a first connector configured to be attached to the host system and having a ring magnet; a second magnetic target connector configured to be attached to the target system and having a ring magnet; and a third magnetic connector configured to be positioned between the first connector and the second connector and having a ring magnet, the ring magnets being approximately equal in diameter such that the first connector, second connector, and third connectors fit together with the ring magnets aligned.

The ring magnet in the third connector can be positioned in the interior of the connector, closer to one face of the connector than to an opposite face of the second connector. In operation, the face of the third connector that is further from the third connector's ring magnet faces toward the first connector, and the face of the third connector that is further from the third connector's ring magnet faces toward the second connector, such that the third connector has a stronger attraction to the second connector.

The first connector's ring magnet can be located at a face of the first connector that faces the third connector, and the second connector's ring magnet can be located at a face of the second connector's ring magnet that faces the third connector. The third connector includes a conduit passing from an outer circumferential edge of the third connector to a central location on the one face of the third that is closer to the interior ring magnet. The conduit can be a fluid flow conduit.

The second connector can have a conduit passing from one face of the second connector to the opposite face of the second connector aligned with the conduit in the third connector along a common centerline of the first, second, and third connectors. The conduits can be configured to transfer electrical power or data.

The ring magnets can be permanent magnets or electromagnets.

The first connector is attached to a robotic arm, and can be attached to a robotic arm on a fuel supply vessel, with the second connector being attached to a vessel to be refueled. The third connector can have a fuel conduit passing from an outer circumferential edge of the second connector to a central location on the one face of the connector that is closer to the interior ring magnet. The system can also include a flexible fuel line extending between the fuel supply vessel and the third connector, and a tether attached to the third connector having a shorter length than the flexible fuel line.

DETAILED DESCRIPTION OF THE INVENTION

The examples shown herein are provided to demonstrate a quick-disconnect robotic fuel dispensing connector that attaches the host system to a target system and transfers fluid between the two of them, allowing fluid transfer in conditions where the host and target systems are moving independent of each other at unknown and uncontrolled relative rates, and to reduce or eliminate the need for human intervention in the process.

The connector is also known as an "end effector", and is capable of self-alignment and autonomous connection to the target fuel tank without direct human intervention.

Figure 1:
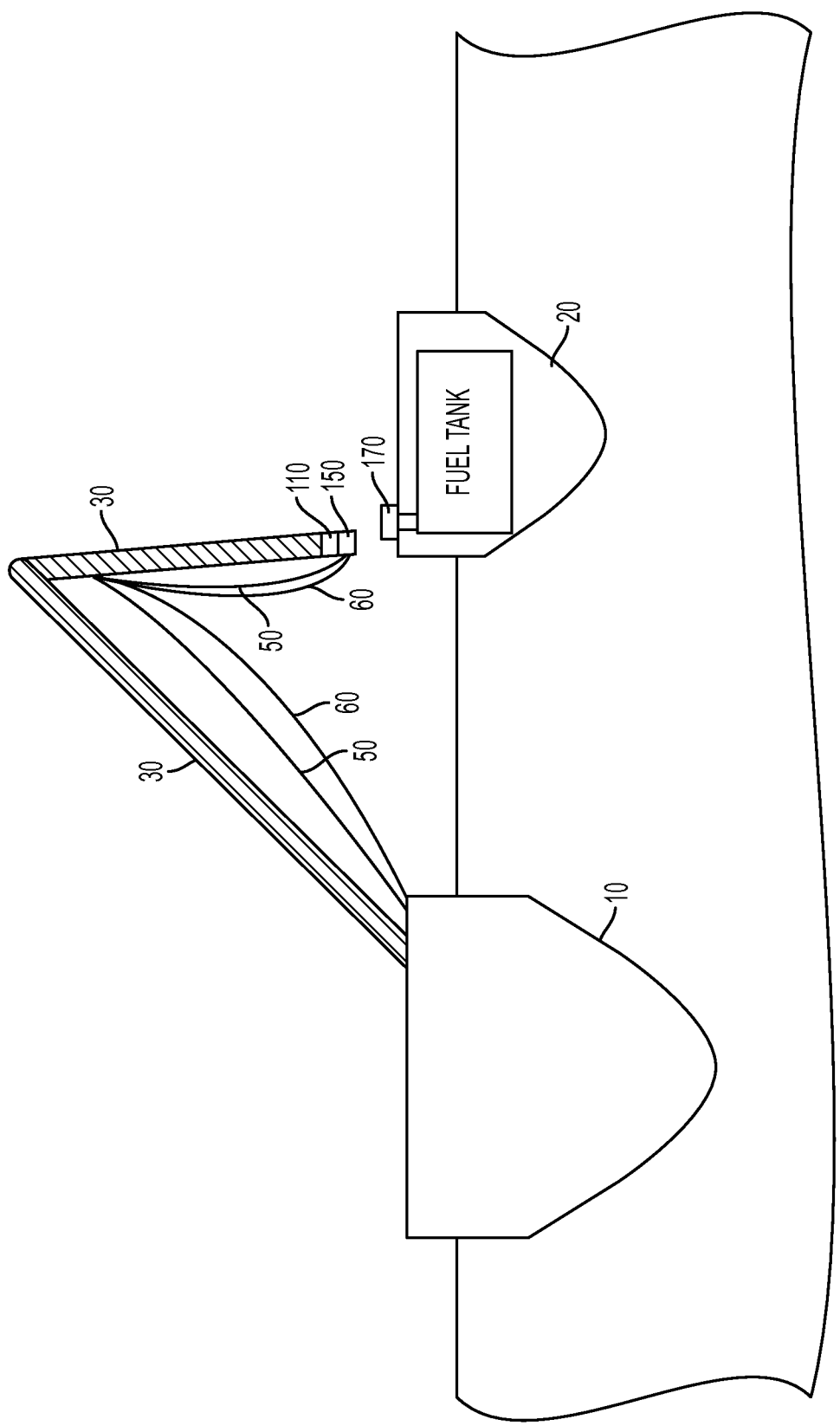
FIG. 1 shows an example of a refueling system that includes a three-component magnetic connector system.

An example of a refueling system that includes the connector system 100 is shown in FIG. 1. In this example, a first connector component 110 is attached to or part of a robotic arm 30 that extends from the refueling vessel 10 toward the target vessel 20 (the vessel to be refueled). A second connector component 170 is attached to or part of the host vessel 20 that is to be refueled by the robotic refueling arm 30. A third connector component or "puck" 150 has the fuel conduit and is generally arranged between the first and second connector components.

In this example, each of the first connector component, the second connector component, and the third connector component are formed of a non-magnetic material, and include a magnet, as will be discussed in more detail. Suitable materials for the non-magnetic material include metals such as aluminum.

The magnets can be permanent magnets or electromagnets. The magnets can be formed of ferromagnetic materials, which are materials that can be magnetized and which are those that are strongly attracted to a magnet. These materials include iron, nickel, cobalt, some alloys of rare earth metals, and some naturally occurring minerals such as lodestone. Ferromagnetic materials can be divided into magnetically "soft" materials like annealed iron, which can be magnetized but do not tend to stay magnetized, and magnetically "hard" materials, which do. Permanent magnets are made from "hard" ferromagnetic materials such as alnico and ferrite that are subjected to special processing in a powerful magnetic field during manufacture, to align their internal microcrystalline structure, making them very hard to demagnetize. An electromagnet is typically made from a coil of wire that acts as a magnet when an electric passes through it but stops being a magnet when the current stops. To enhance the magnetic field produced by the coil, the coil can be wrapped around a core "soft" ferromagnetic material such as steel. The overall strength of a magnet is measured by its magnetic moment or, alternatively, the total magnetic flux it produces. The local strength of magnetism in a material is measured by its magnetization.

Figure 2A:
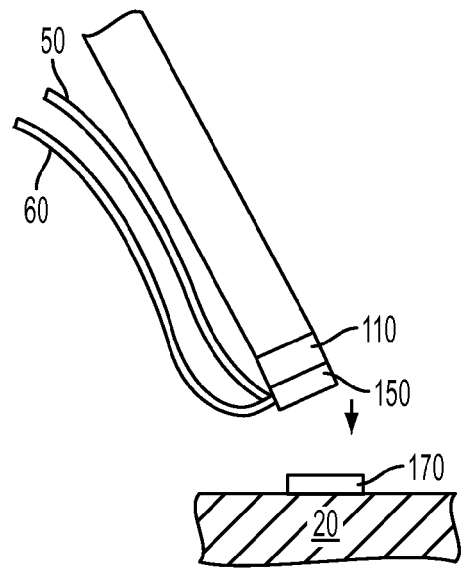
FIGS. 2A, 2B, and 2C illustrate an example of a three-component magnetic connector system configured with one of the connectors on the end of a robotic arm.

As seen in FIG. 2A, when the robotic arm is far away from the target vessel 20, the first component 110 and the puck 170 are held together by magnetic attraction between them.

Figure 2B:
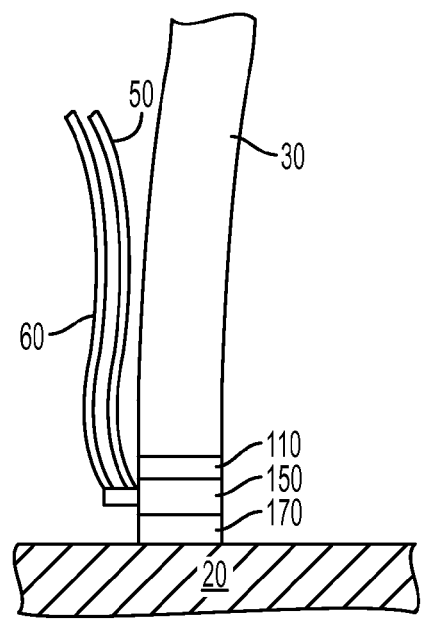

When the robotic arm is moved close to the target vessel, the magnetic attraction between the puck 170 and the second component 150 helps align the puck and first connector on the end of the robotic arm with the second component on the target vessel. FIG. 2B shows the first connector, second connector, and third connector held together by magnetic attraction.

Figure 2C:
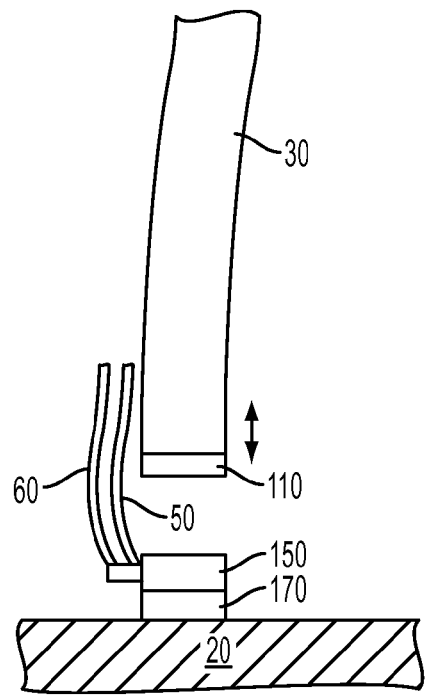

As shown in FIG. 2C, if the robotic arm and target vessel 20 move away from each other with a sudden jolt, because the magnetic field strength between the first connector 110 and the puck 150 is weaker than between the puck 150 and the second connector 170, the first connector 110 and its robotic arm are pulled away from the puck. However, the stronger magnetic attraction between the puck 150 and the second connector 170 on the target vessel keeps the puck seated against the second connector, allowing the fuel to continue to flow into the target vessel's fuel tank.

Figure 3A:
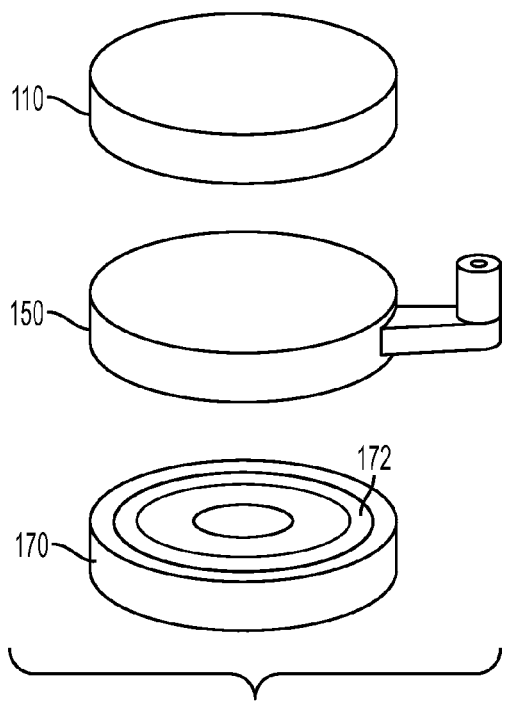
FIGS. 3A and 3B show the three magnetic connector components without the robotic arm, fuel line, and target vessel from two different viewpoints.
Figure 3B:
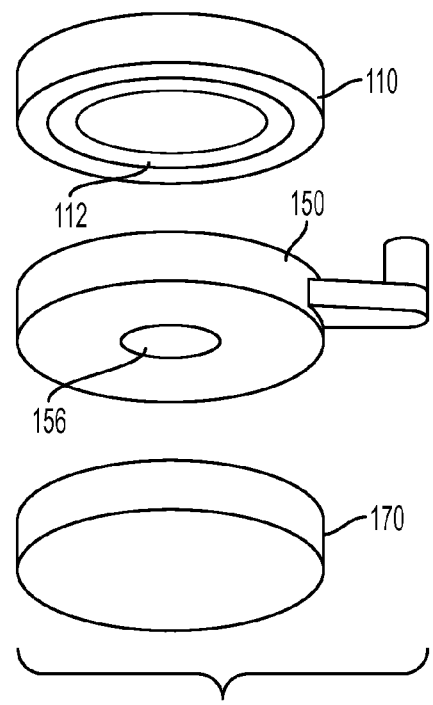

FIGS. 3A and 3B show the three components without the robotic arm, fuel line, and target vessel from two different viewpoints.

Figure 4:
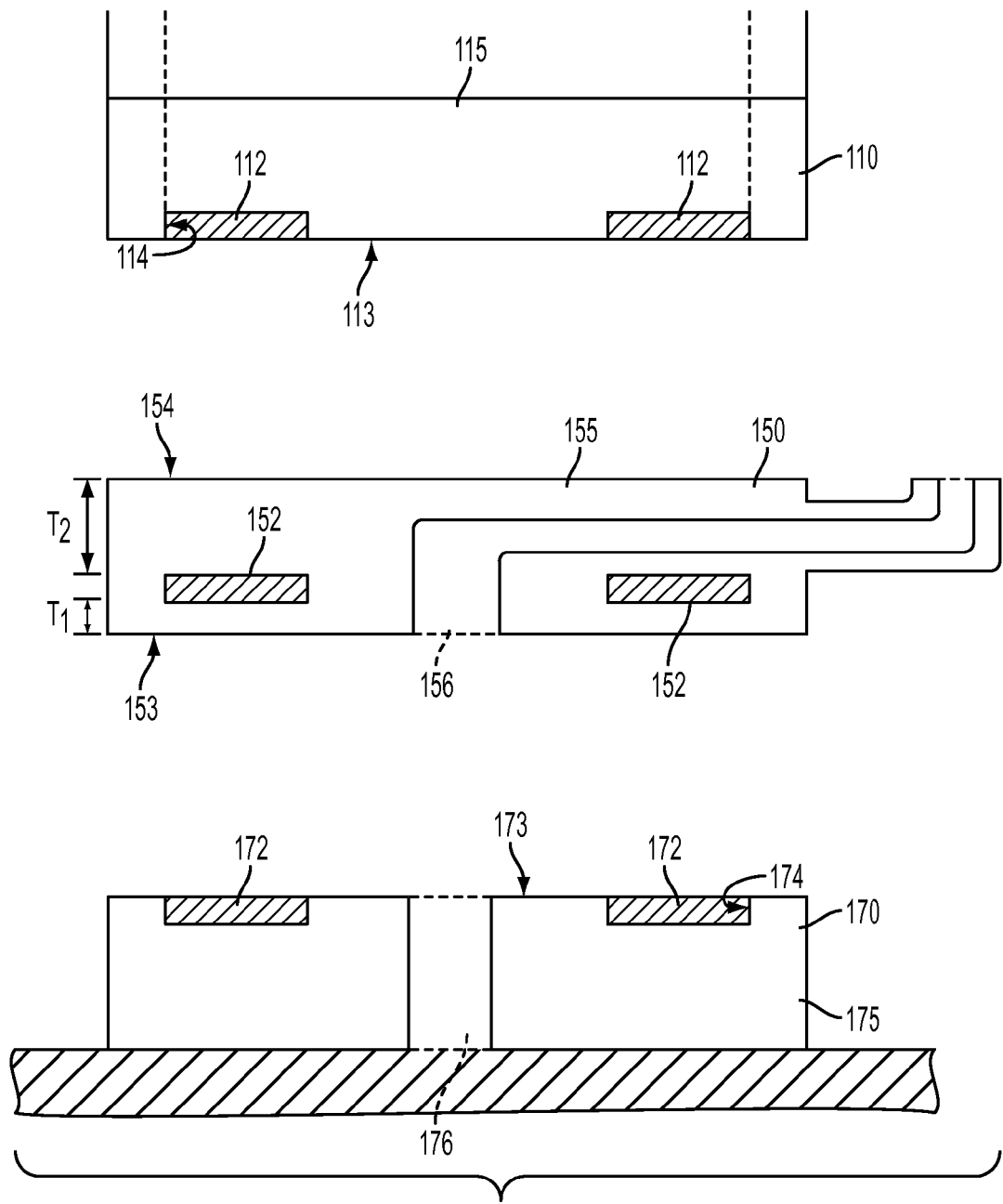
FIG. 4 is a cross sectional view of a connector system with the three primary magnetic connectors.

FIG. 4 is a cross sectional view of the three components.

The first connector 110 has a body 115 formed of a nonmagnetic material such as aluminum, with a circular groove 114 in the mating face 113 of the connector. A ring magnet 112 is affixed within the circular groove. In this example, the surface of the ring magnet 112 and the connector face 113 are flush, allowing the entire face of the connector 110 to mate with the surface 154 of the puck 150.

The second connector 170 has a body 175 formed of a nonmagnetic material such as aluminum, with a circular groove 174 in the mating face 113 of the connector. A ring magnet 172 is affixed within the circular groove. In this example, the surface of the ring magnet 172 and the connector face 173 are flush, allowing the entire face 173 of the connector 170 to mate with the surface 153 of the puck 150.

The puck 150 can also include a conduit 156 through which a fuel or other liquid will flow into a matching conduit 176 in the second connector 170. The fluid flow conduits are preferably positioned along the centerline of the system, so that fluid conduits will line up regardless of any rotation of any of the three components around the central axis.

The puck 150 has a ring magnet 152 that is embedded within the non-magnetic body 155 of the puck. The ring magnet is preferably located closer to one face of the puck than to the other face of the puck, so the magnetic attraction between the puck and one of the connectors will be stronger than between the puck and the other one of the connectors. In this example, the ring magnet is located closer to surface 153 that, in operation, faces the target vessel connector 170. In this way, if the movement between the two vessels is great enough to pull the connectors apart while fuel is being dispensed, the fuel-dispensing puck 150 will be more attracted to the fuel-receiving target vehicle connector 170 than to the first connector 110 on the host vehicle's robotic arm.

For example, the ring magnet 152 could be ½ inches from the puck surface 154 and ¼ inches from the opposite puck surface 153. If a change in magnetic strength is necessary for a particular application, the puck 150 can be thinned on one side by machining away some of the puck on one of the faces until the desired relative magnetic field strengths are obtained.

Although the ring magnets in the first and second connectors are shown as flush with the connector surfaces in FIG. 4, it can also be suitable for the ring magnets 112 and 172 in the connectors to be set back from the surfaces of the connectors 110 and 172. They can be set back from the near surfaces by the same amount, so that the magnetic field strength between each pair of magnets being set by the location of the ring magnet 152 in the puck 150.

It can also be suitable for the faces of the components to have matching mating surfaces that are not flat. For example, the second connector 170 can have a concave surface, with a matching convex face on the surface 153 of the puck. This can improve initial alignment between the connectors and reduce or prevent spillage.

Referring again to FIG. 4, it is seen that the ring magnets are circular and have a same diameter. This provides a self alignment capability, with magnetic attraction between the ring magnets 112 and 152 and between the ring magnets 112 and 172, the such that the magnetic fields will cause the connectors to move together with the ring magnets vertically aligned. This provides a self alignment capability for the system.

Because the ring magnets are circular and the fuel conduits 156 and 176 through the puck and the second connector are arranged along the centerline of the system, the puck 150 can rotate in any direction, as long as it is sandwiched between the connectors 110 and 170, and the fuel will continue to flow through the puck into the target vessel.

Note that the first connector 110 does not include any part of the flow conduit, so if it is pulled away from the target vessel connector 170 and puck 150, connection between the fuel line and the target vessel will not be lost.

In a currently preferred example, the bodies of each of the connectors 110, 150, 170 are a non-magnetic metal such as aluminum and the ring magnets 112, 152, 172 are rare earth element magnets.

The system can include an electronic-disconnect sensor (not shown) to determine when either portion of the system has lost connection. Thus, when the puck 150 loses connection with either the first connector 110 or the second connector, the disconnect sensor and an associated control system can cause a shut-off of the flow through the conduit, sound an alarm, or take other actions. The system can also incorporate a wired or wireless communications link to inform the system operator of loss of the connection.

The system can also include flexible rings (not shown) on the mating surfaces that improve the seal between the puck 150 and the target vessel connector 170 and/or the host vessel connector 110.

Figure 5:
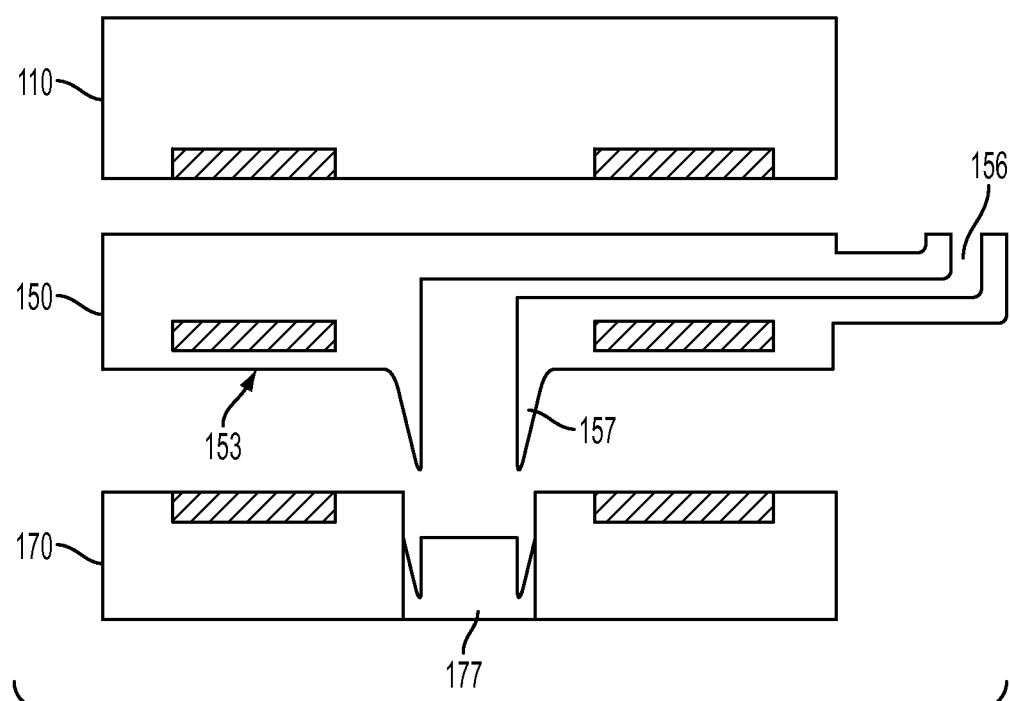
FIG. 5 is a cross sectional view of another example connector system.

As shown in FIG. 5, the system can also include one or more protrusions 157 on the target-side of the puck face 153 that open a flow valve 177 within the target fuel receptacle when attached, to prevent backflow.

Figure 6B:
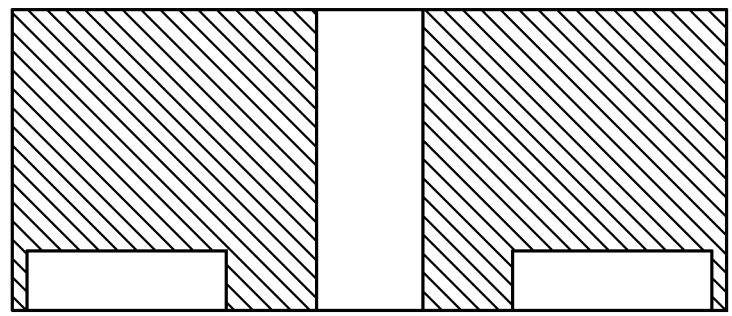
FIGS. 6A and 6B illustrate schematic drawings of an example magnetic system casing 180 for a connector.
Figure 6A:
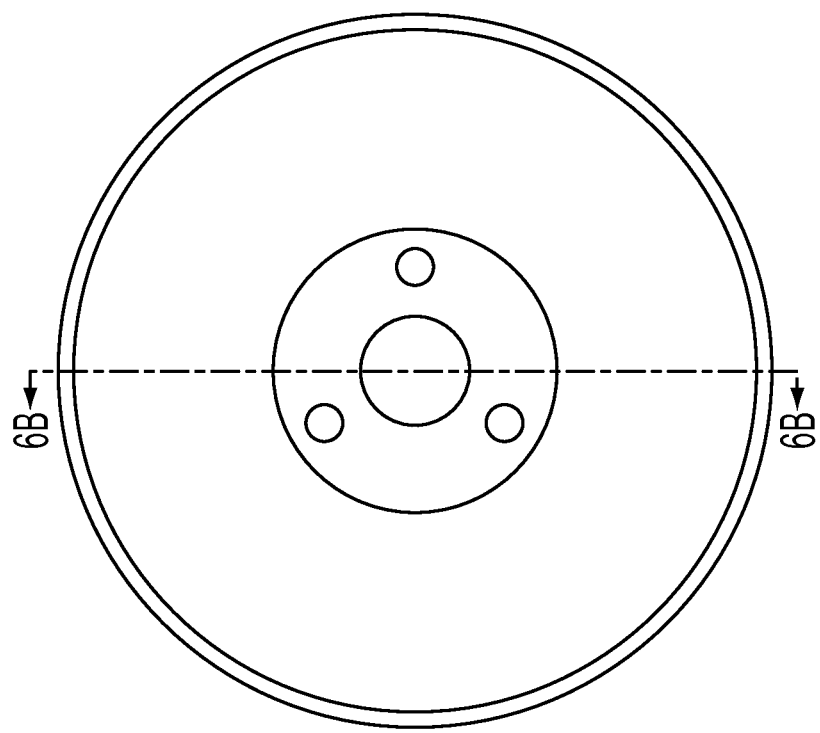

FIGS. 6A and 6B illustrate schematic drawings of an example magnetic system casing for a connector. The groove houses the ring magnet for the connector.

Figure 7C:
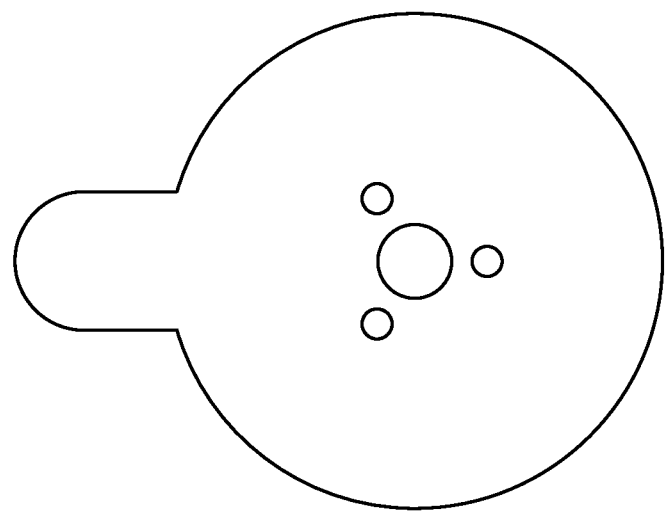
FIGS. 7A, 7B, and 7C are schematic drawings of an example puck connector, showing a fluid conduit.
Figure 7B:
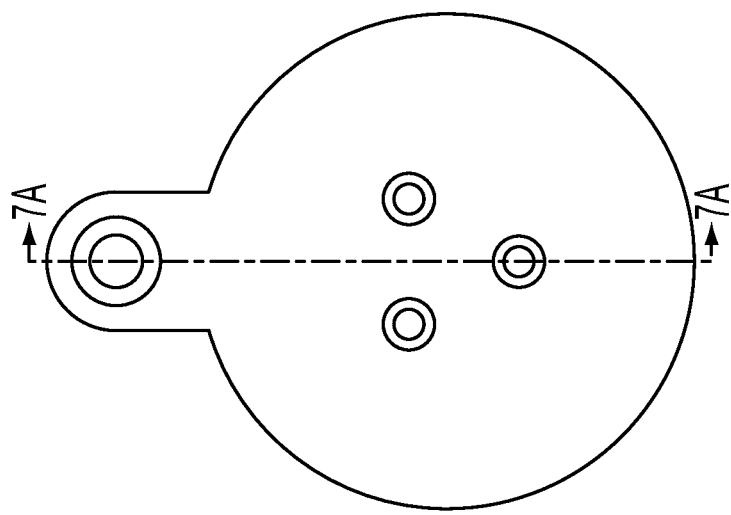
Figure 7A:
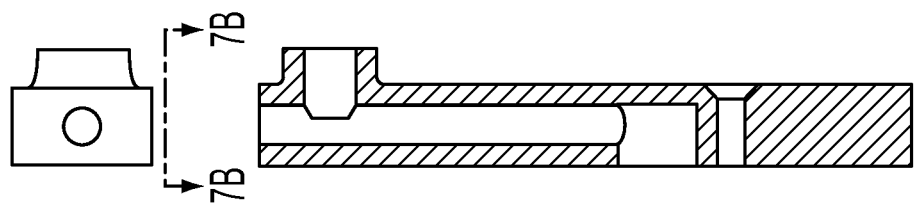

FIGS. 7A, 7B, and 7C are schematic drawings of an example puck connector, showing a fluid conduit. The interior ring magnet is not shown.

Referring again to 1, FIGS. 2A, 2B, and 2C, fuel line 50 is a flexible hose that is not structurally supporting, and has sufficient slack in its length that it is unaffected by dramatically shifting distances between the host system and the target system.

However, the system can also include a tether 60 attached to the puck 150 at one end and to a component of the robotic arm or the host vessel at the other end. The tether 60 and the fuel transfer line 50 are both sufficiently long to allow the puck 150 to remain in contact with the target vessel connector 170 in spite of some motion between the host vessel and the target vessel. The tether 60 but will pull the puck away 150 from the target vessel connector 170 if the separation becomes too great. In a preferred embodiment, the tether 60 is slightly shorter than the fuel supply line 50 so any strain will be taken up by the tether rather than the fuel line. This prevents damage to the fuel line 50 and loss of the puck 150.

The tether 60 and fuel transfer line 50 can also be integrated into a single cable assembly, with a strength member acting as the tether and a fuel line operable to transfer the fuel.

In systems in which one or more of the ring magnets are electromagnets, rather than permanent magnets, the system will also include a control system that energizes or deenergizes each of the electromagnets. The inclusion of electromagnets provides active control of the connection between the host and the puck, as well as between the target and the puck. This active control allows the magnetic field between the puck and target system to be deactivated, so the puck can be captured by the host connector and stowed on the host vessel with the other refueling system components. Without electromagnets, the puck is manually removed from the target vessel connector, or pulled away by the tether.

In an electromagnet based connection system, the relative magnetic attraction between the components is actively controlled. Therefore, it is not necessary to design the system with particular non-magnetic material thicknesses to vary the strength of the magnetic force.

It is also suitable for an electromagnet based connection system to include only the two connector components 110 and 170, without the puck 150. A controller energizes the electromagnets to connect the components 110 and 170, and deenergizes the electromagnets to allow the connectors to be disconnected from each other. In such an embodiment, the host connector can include a fuel conduit that exits through the centerline of the host connector at the face of the host connector that faces the target vessel connector. This allows the fuel transfer to be accomplished regardless of polar orientation of the connectors 110 and 170, as with the puck-based system described above.

The examples discussed above refer to a fuel or fluid transfer system. The system can additionally include connectors for electrical power, data, or other transferrable entities.

The system can also be configured to transfer only power or data, with no liquid transfer, and with the conduit through the puck 150 and the second connector being suitable for carrying the data or power (e.g., data transfer lines, optical fibers, communications lines, electrical conductors, etc.).

The system can also include rubber or other flexible rings or gaskets between the mating surfaces to improve the seal between the surfaces.

The system described herein can also suitably be used for non-fluid applications. For example, the system can connect the host and target systems and transfer power, data, or a combination of power, data, and fluid.

The system is not limited to ships or other waterborne vessels. In other examples, the host and target systems between which an entity is transferred are unmanned or manned systems, underwater vehicles or systems, ground vehicles or systems, aircraft, robotic systems, or space or satellite systems.

The invention has been described with reference to certain preferred embodiments. It will be understood, however, that the invention is not limited to the preferred embodiments discussed above, and that modification and variations are possible within the scope of the appended claims.

The invention claimed is:

1. A magnetic connection system having at least three components for connecting a host system and a target system, comprising:
   a first connector configured to be attached to the host system and having a first ring magnet;
   a second connector configured to be attached to the target system and having a second ring magnet, wherein the second connector has a first conduit passing from a face of the second connector to an opposite face of the second connector aligned with a second conduit in a third connector along a common centerline of the first, second, and third connectors, and wherein the second connector has an opening that is aligned with the second conduit in the third connector; and
   the third connector configured to be positioned between the first connector and the second connector and having a third ring magnet, wherein the second conduit passes from an outer circumferential edge of the third connector to a central location on a face of the third connector, and wherein when the first connector and the host system are separated from the third connector, the third connector and second connector remain connected such that a flow through the first and second conduits is maintained,
   wherein in operation, the magnetic fields of the first connector, the second connector, and the third connector align around a central axis of the ring magnets when pulling the connectors together.

2. The magnetic connection system according to claim 1, wherein the third ring magnet is positioned in the interior of the third connector, closer to the face of the third connector than to an opposite face of the third connector, wherein the ring magnets are approximately equal in diameter such that the first connector, second connector, and third connector fit together with the ring magnets aligned.

3. The magnetic connection system according to claim 1, wherein the third ring magnet is positioned in the interior of the third connector, closer to the face of the third connector than to an opposite face of the third connector, such that the third connector has a stronger attraction to the second connector.

4. The magnetic connection system according to claim 1, wherein the first ring magnet is located at a face of the first connector that faces toward the third connector in operation, and the second ring magnet is located at the face of the second connector that faces toward the third connector in operation.

5. The magnetic connection system according to claim 1, wherein the first and second conduits are fluid flow conduits.

6. The magnetic connection system according to claim 1, wherein the ring magnets are permanent magnets.

7. The magnetic connection system according to claim 1, wherein at least one of the ring magnets is an electromagnet.

8. The magnetic connection system according to claim 1, wherein the first connector is attached to a robotic arm.

9. The magnetic connection system according to claim 1, wherein the first connector is attached to a robotic arm on a fuel supply vessel, wherein the second connector is attached to a vessel to be refueled, and wherein the first and second conduits are configured to transfer fuel.

10. The magnetic connection system according to claim 9, further comprising:
a flexible fuel line extending between the fuel supply vessel and the third connector.

11. The magnetic connection system according to claim 10, further comprising:
a tether attached to the third connector having a shorter length than the flexible fuel line.

12. The magnetic connection system according to claim 1, where non-magnetic components of the first connector, the second connector, and the third connector comprise aluminum.

13. A magnetic connection system having at least three components for connecting a host system and a target system, comprising:
a first connector configured to be attached to the host system and having a magnet;
a second connector configured to be attached to the target system and having a magnet, wherein the second connector has a first conduit passing from a face of the second connector to an opposite face of the second connector aligned with a second conduit in a third connector along a common centerline of the first, second, and third connectors, and wherein the second connector has an opening that is aligned with the second conduit in the third connector; and
the third connector configured to be positioned between the first connector and the second connector and having a magnet, at least two of the magnets having different strengths such that the magnetic attraction between the second connector and the third connector is stronger than the magnetic attraction between the third connector and the first connector, wherein the second conduit passes from an outer circumferential edge of the third connector to a central location on a face of the third connector, and wherein when the first connector and the host system are separated from the third connector, the third connector and second connector remain connected such that a flow through the first and second conduits is maintained.

14. The magnetic connection system according to claim 13, wherein the magnet in the third connector is positioned in the interior of the connector, closer to the face of the third connector than to an opposite face of the third connector, such that third connector has a stronger attraction to the second connector than to the first connector.

15. The magnetic connection system according to claim 14, wherein the first connector's magnet is located at a face of the first connector that faces toward the third connector, and the second ring magnet is located at the face of the second connector that faces toward the third connector.

16. The magnetic connection system according to claim 13, wherein the second conduit is for transferring fluid, to the second connector.

17. The magnetic connection system according to claim 16, wherein the second connector has an opening that is aligned with the second conduit in the third connector.

18. The magnetic connection system according to claim 13, wherein the magnets are permanent magnets.

19. The magnetic connection system according to claim 13, wherein the magnets are electromagnets.

20. The magnetic connection system according to claim 13, wherein the first connector is attached to a robotic arm.

21. The magnetic connection system according to claim 13, wherein the first connector is attached to a robotic arm on a fuel supply vessel, and the second connector is attached to a vessel to be refueled.

22. The magnetic connection system according to claim 13, further comprising:
a flexible fuel line extending between the fuel supply vessel and the third connector.

23. The magnetic connection system according to claim 22, further comprising:
a tether attached to the third connector having a shorter length than the flexible fuel line.

24. The magnetic connection system according to claim 1, where non-magnetic components of the first connector, the second connector, and the third connector comprise aluminum.

* * * * *